United States Patent Office 3,140,221
Patented July 7, 1964

3,140,221
UNSATURATED POLYESTER RESIN FORMED FROM AN AROMATIC GLYCOL, INTERPOLYMERS THEREOF, AND ARTICLES FORMED THEREFROM
Raymond Liebling, Springfield, N.J., and Robert Steckler, Russel Township, Geaugan County, Ohio, assignors to Nopco Chemical Company, Harrison, N.J., a corporation of New Jersey
No Drawing. Filed Aug. 7, 1958, Ser. No. 753,607
22 Claims. (Cl. 161—195)

The present invention relates to novel aromatic glycols, unsaturated polyester resins obtained therefrom, the polymerization of such resins and the preparation of coating compositions, molding compositions, molded articles, laminated articles and the like from the polymerized resins.

Those engaged in the art are constantly seeking new and improved products for use as coatings, castings, laminates, etc. Among the objectives sought after are the preparation of resins which, if used as coatings are tenacious, flexible, alkali and water-resistant and soluble in relatively inexpensive organic solvents. If the resins are to be used as castings and laminates, they should exhibit a minimum of shrinkage and exhibit resistance to cracking and crazing. These resins should also be tough in order to withstand shock and abrasion. Furthermore, the unsaturated polyester should be prepared in as direct and economical a manner as possible. The dihydroxy and dicarboxylic components should condense or esterify easily under moderate reaction conditions. Under the conditions of esterification, no dehydration should occur. The resulting potentially polymerizable polyester resin should be stable during storage while cross-linking should be accomplished without difficulty. The resin should be capable of being blended with various other components as well as ancillary ingredients in order to permit the formulation of various compositions directed to specific problems.

We have unexpectedly accomplished the above as well as other objects in the following manner. We have discovered a novel class of aromatic glycols which, when availed of in the preparation of resins to be described hereinafter, brings about superior resins having great utility as molding materials, laminating materials, coating compositions, etc.

Our novel class of aromatic glycols may be described as a condensate of ethylene oxide and an alkylated bisphenol, said condensate being represented by the following structure

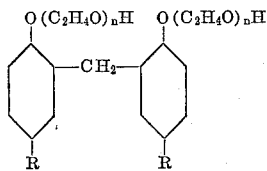

in which R is a straight or branched chain or carbocyclic alkyl substituent having from about 5 to 12 carbon atoms and $n$ is an average number lying between one and two.

The unique structure of our aromatic glycols imparts many valuable properties to resins containing the same. It also brings about improved reaction in the resin preparation. By replacing the phenolic hydroxyl groups with primary alcoholic groups, a material is obtained which may be easily esterified while at the same time is not subject to undesirable dehydration reactions or side reactions since the alcoholic groups derived from ethylene oxide are primary alcohol groups. The resin has been found to exhibit extreme hydrophobic properties which are believed to be imparted by the alkyl substituents attached to the aromatic nuclei. The resins are extremely flexible due to the presence of the alkyl substituents. They are also water resistant and easily soluble in relatively inexpensive organic solvents, no doubt due to the presence of the alkyl substituents and the aromatic nuclei. Furthermore, they have been found to be highly resistant to alkalis. Of special advantage is the fact that the unsaturated polyester resin has been found to be exceedingly soluble in styrene without bringing about an undue increase in viscosity.

We are aware of the preparation of other aromatic hydroxy compounds such as those described in U.S. Patent No. 2,454,542, Bock et al., issued November 23, 1948. However, the compounds described in this patent call for at least three aromatic hydroxy substituents whereas we have described two. Such polyfunctional materials of the prior art are different from our glycols. For instance, if they are reacted with dibasic acids in attempts to form polyesters, cross-linking and gelation will occur at low degree of esterification thereby rendering the resulting product useless for our purposes.

These aromatic glycols may be prepared as follows. First, a bis-phenol is prepared by reacting from 1.67 to 2.00 mols of a para substituted alkyl phenol with one mol of formaldehyde or equivalent amounts of a paraformaldehyde, trioxane, etc. Suitable substituted phenols are p-amyl phenol, p-tertiary amyl phenol, p-hexyl-phenol, p-cyclohexyl phenol, p-octyl phenol, p-decyl phenol and p-dodecyl phenol. Condensation temperatures of from 65° to 105° C. are maintained for about 2 to 6 hours. The resulting product is essentially a bis-phenol of the formula

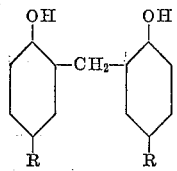

wherein the substituent, R, is as described previously. The bis-phenol is thereafter reacted with ethylene oxide in amounts to provide for an average of from about 1 to 2 mols, preferably 1.1 to 1.5 mols, of ethylene oxide per phenolic hydroxyl group. The ethylene oxide addition is carried out by reacting the bis-phenol with ethylene oxide at 150° to 200° C., optionally under pressure e.g., 25 p.s.i. in the presence of about 0.1% alkali hydroxide or alkali metal carbonate as catalyst.

The above aromatic glycol is thereafter reacted with an unsaturated dicarboxylic acid or anhydride or mixtures thereof, e.g., maleic acid, maleic anhydride, fumaric acid, itaconic acid, citraconic acid, mesaconic acid, etc., in a mol ratio of from 1.0 to 1.04 mols of aromatic glycol per mol of acid at temperatures from 150° C. to 200° C. for from about 2 to 4 hours. The reaction for the preparation of the unsaturated polyester is preferably carried out until an acid value of 40 or less, e.g., 35 to 40 is reached. The resulting polyesters range from hard to tacky amber resins which readily disperse in styrene.

Cross-linking of the unsaturated polyester is accomplished by treatment with a vinyl compound capable of copolymerizing with the unsaturated polyester, e.g., styrene. We have also found that our unsaturated polyesters are exceedingly soluble in styrene without bringing about an undue increase in viscosity of the resulting styrene solutions. The amount of vinyl monomer is usually about 25% to 50% by weight based on the weight of the two materials. Cross-linking is generally accomplished by free radical polymerization, the free radical being generated by thermal or photolytic means or by decomposition of a free radical-forming substance, e.g., benzoyl peroxide, diacetyl peroxide, etc. Other useful cross-linking agents are α-methyl styrene; alkyl styrenes, e.g., o-methyl styrene, p-ethyl styrene, and 2,4-dimethyl styrene; diallyl phthalate, esters of acrylic and methacrylic acid, e.g., methyl acrylate; acrylonitrile, vinyl pyrrolidone, vinyl pyridine and ethyl vinyl pyridine. The resulting interpolymers of the unsaturated polyester and cross-linking agent may be used alone or with fillers or other modifying agents, for example, in casting, molding and laminating applications. They may serve as adhesives or as impregnants for many porous bodies such as cork, pottery, felts or fabricated bodies with interstices, e.g., the windings of electrical coils, netted fiber, interwoven fibrous materials, etc. They also may be used for protectively coating articles or substrates such as paper, wood, cloth, glass fibers, concrete, metals, other resinous or plastic materials, etc. They also may be employed in the production of wire enamels and winding tapes. The mixed components or partial interpolymers thereof, with or without modifying agents, may be cast and molded under heat or under heat pressure. They may be molded by compression molding techniques whereby they are heat- and pressure-hardened to yield molded articles of manufacture for various industrial, household and novelty uses.

When moldings or laminates, or for that matter, coatings are to be prepared, various fillers, pigments, dyes, etc., may be added to the mixture of unsaturated polyester and cross-linking agents. Exemplary of such ancillary ingredients are: lignocellulose materials such as wood flour and wood fiber, alpha cellulose, paper dust, clay, diatomaceous earths, zein, glass wool, mica, granite dust, cotton flock, steel wool, silicon carbide, paper, cloth of any fiber including glass, sand, silica flour and white, black or colored pigments, e.g., titanium dioxide, iron oxides and barytes.

For a fuller understanding of the nature and objects of the invention, reference may be made to the following examples which are given merely to illustrate the invention and are not to be construed in a limiting sense.

The first example is directed to the preparation of our aromatic glycol.

EXAMPLE I

A. *Preparation of the Bis-Phenol*

7.97 parts by weight of trioxane were added to 91.15 parts by weight of p-tertiary octyl phenol and the resulting mixture heated to 55° C. until the phenol was melted. The tertiary octyl substituent was derived from diisobutylene and has the structure

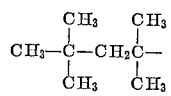

Diisobutylene is primarily a mixture of 2,4,4-trimethylpentene-1 and 2,4,4-trimethylpentene-2. 0.88 part by weight of a 37% by weight concentrated hydrochloric acid solution was carefully added to the mixture of trioxane and phenol and the temperature allowed to rise to 95° C. and maintained at 95° C. for 6 hours during which time the reaction mass was vigorously agitated. Thereafter, the reaction mass which was a pinkish-white viscous material was neutralized with 0.96 part by weight of 50% by weight aqueous potassium carbonate solution and agitated for an additional half hour. The mass was then brought up to a temperature of 150° C. while under a nitrogen atmosphere and this temperature was maintained for 2 hours. The product, which was essentially a bis-phenol was a pinkish, tacky resin having a total alkali of 0.05%.

B. *Preparation of the Bis-Phenol Ethylene Oxide Condensate*

96.8 parts by weight of ethylene oxide were slowly added to 424 parts by weight of the bis-phenol of part A in the presence of 0.4 part by weight of potassium carbonate as catalyst which was dispersed in said bis-phenol. The temperature was maintained at 170° C. during the ethylene oxide addition. The resulting condensate which was the aromatic glycol was purged with nitrogen. It was a clear amber, tacky resin at room temperature.

EXAMPLE II 280 grams (0.5 mol) of the aromatic glycol of Example I were placed in a flask fitted with an agitator, Dean-Stark trap and a nitrogen inlet tube and melted in the presence of 100 cc. of benzene by heating at 90° C. Thereafter 47.5 grams (0.485 mole) of maleic anhydride were added to the flask. The temperature of the flask was raised to 150° C. and the water of esterification was allowed to azeotropically distill off as it formed. A nitrogen atmosphere was maintained during the reaction. When an acid value of 39 was reached, a vacuum was carefully applied and the temperature was allowed to rise to 160° C. where it was maintained for one-half hour.

The resulting polyester resin was cooled somewhat and added to cold styrene so that a solution containing 70% by weight of polyester resin and 30% by weight of styrene was obtained. The viscosity of the final solution was $Z_3$ (Gardner-Holdt). To 10 grams of this solution, 0.1 gram of benzoyl peroxide contained in 0.1 gram of tricresyl phosphate was added and the temperature gradually raised to 100° C. to induce cross-linking. The resulting material was a clear, hard, tack-free casting.

The following example is directed to a laminated article in which the laminae are fiberglass sheets and the bonding agent is an interpolymer obtained from an unsaturated polyester derived from our aromatic glycol and a cross-linking agent.

EXAMPLE III

A polyester was first prepared as indicated in the first paragraph of Example II. This polyester was then added to cold styrene so that a solution containing 60% by weight of polyester and 40% by weight of styrene was obtained. A catalyst containing equal parts by weight of benzoyl peroxide and tricresyl phosphate was added to the solution in an amount of 2% by weight of said solution. Thereafter the catalyzed solution was added to a matched metal die in which was previously placed three sheets of Owens-Corning Fiberglass two ounce mat having a No. 216 finish. The material was cured at 240° F. for 10 minutes under approximately 6,000 pounds total pressure. In this manner a light colored, bubble free and flexible three ply sheet measuring 5″ x 5″ x ⅛″ was obtained. It contained 40% by weight of the glass fiber sheets and 60% by weight of cross-linked resin. The laminate was further characterized by excellent flexibility, good impact strength and negligible water take-up after immersion in boiling water for two hours.

Having described our invention, what we claim is new and desire to secure by Letters Patent is:

1. An ethylenically unsaturated polyester resin consisting essentially of the reaction product of an aromatic glycol having the formula

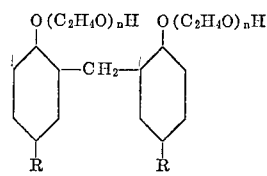

wherein R is an alkyl substituent having from about 5 to 12 carbon atoms and *n* varies from 1 to 2, and at least one member of the group consisting of monoethylenically unsaturated dicarboxylic acids and anhydrides thereof.

2. The polyester of claim 1 in which *n* varies from 1.1 to 1.5.

3. The polyester of claim 2 in which R of said aromatic glycol is

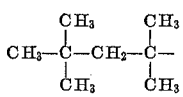

4. An ethylenically unsaturated polyester resin consisting essentially of the reaction product of from about 1.0 to 1.04 mols of an aromatic glycol having the formula

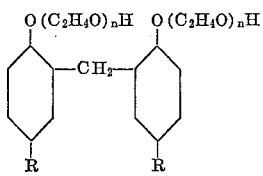

wherein R is an alkyl substituent having from about 5 to 12 carbon atoms and $n$ varies from 1 to 2, and one mol of at least one member of the group consisting of monoethylenically unsaturated dicarboxylic acids and anhydrides thereof.

5. An ethylenically unsaturated polyester resin consisting essentially of the reaction product from about 1.0 to 1.04 mols of an aromatic glycol having the formula

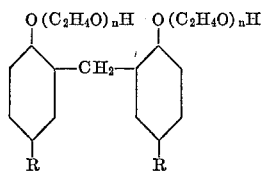

wherein R is an alkyl substituent having from about 5 to 12 carbon atoms and $n$ varies from 1.1 to 1.5, and one mol of at least one member of the group consisting of monoethylenically unsaturated dicarboxylic acids and anhydrides thereof.

6. The polyester of claim 5 in which R of said aromatic glycol is

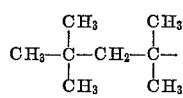

7. The polyester of claim 6 in which said anhydride is maleic anhydride.

8. An interpolymer of an (1) ethylenically unsaturated polyester resin consisting essentially of the reaction product of (a) an aromatic glycol having the formula

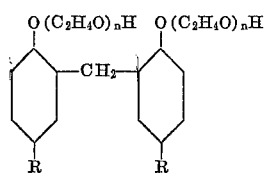

wherein R is an alkyl substituent having from about 5 to 12 carbon atoms and $n$ varies from 1 to 2, and (b) at least one member of the group consisting of monoethylenically unsaturated dicarboxylic acids and anhydrides thereof, and (2) a cross-linking agent which is an unsaturated monomer copolymerizable with said polyester resin.

9. The interpolymer of claim 8 in which said cross-linking agent is present in an amount of from 25% to 50% by weight of said polyester resin.

10. The interpolymer of claim 8 in which said cross-linking agent is styrene.

11. The interpolymer of claim 8 in which the value of $n$ is from 1.1 to 1.5.

12. The interpolymer of claim 11 in which R of said aromatic glycol is

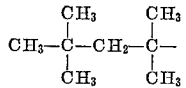

13. The interpolymer of claim 11 in which said anhydride is maleic anhydride.

14. An interpolymer of (1) an ethylenically unsaturated polyester resin consisting essentially of the reaction product of (a) from about 1.0 to 1.04 mols of an aromatic glycol having the formula

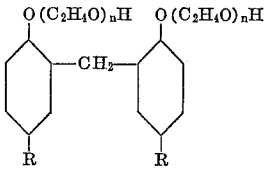

wherein R is an alkyl substituent having from about 5 to 12 carbon atoms and $n$ varies from 1 to 2, and one mol of (b) at least one member of the group consisting of monoethylenically unsaturated dicarboxylic acids and anhydrides thereof, and (2) a cross-linking agent which is an unsaturated monomer copolymerizable with said polyester resin.

15. The interpolymer of claim 14 in which said cross-linking agent is present in an amount of from 25% to 50% by weight of said polyester resin.

16. The interpolymer of claim 15 in which said cross-linking agent is styrene.

17. The interpolymer of claim 15 in which R of said aromatic glycol is

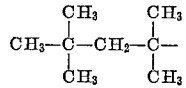

18. The interpolymer of claim 15 in which said anhydride is maleic anhydride.

19. A coated article comprising a substrate and, as a coating therefor, the interpolymer of claim 14.

20. A coated article comprising a substrate and, as a coating therefor, the interpolymer of claim 15.

21. A laminated article comprising laminae bonded together with the interpolymer of claim 14.

22. A laminated article comprising fiberglass laminae bonded together with the interpolymer of claim 14.

References Cited in the file of this patent

UNITED STATES PATENTS

| | | |
|---|---|---|
| 2,499,360 | De Groote et al. | Mar. 7, 1950 |
| 2,499,363 | De Groote et al. | Mar. 7, 1950 |
| 2,634,251 | Kass | Apr. 7, 1953 |
| 2,686,164 | Arvin et al. | Aug. 10, 1954 |

FOREIGN PATENTS

| | | |
|---|---|---|
| 515,907 | Great Britain | Dec. 18, 1939 |

OTHER REFERENCES

Jordan: "Technology of Solvents," 2d Edition, 1939, pages 5–12.

Conant et al.: "The Chemistry of Organic Compounds," 5th Edition, The Macmillan Company, New York, 1959, page 146.